(12) United States Patent
Lichtenberger et al.

(10) Patent No.: US 7,033,730 B2
(45) Date of Patent: Apr. 25, 2006

(54) SILVER-REACTIVE METAL ALLOYS FOR OPTICAL DATA STORAGE AND RECORDABLE STORAGE MEDIA CONTAINING SAME

(75) Inventors: Heiner Lichtenberger, Williamsville, NY (US); Derrick L. Brown, St. Catherines (CA); Scott Haluska, Amherst, NY (US)

(73) Assignee: Williams Advanced Materials, Inc., Buffalo, NY (US)

( * ) Notice: Subject to any disclaimer, the term of this patent is extended or adjusted under 35 U.S.C. 154(b) by 131 days.

(21) Appl. No.: 10/606,885

(22) Filed: Jun. 26, 2003

(65) Prior Publication Data

US 2004/0048193 A1 Mar. 11, 2004

Related U.S. Application Data

(60) Provisional application No. 60/392,729, filed on Jun. 28, 2002.

(51) Int. Cl.
*G11B 7/24* (2006.01)

(52) U.S. Cl. ............... 430/270.11; 430/945; 428/64.4; 369/288

(58) Field of Classification Search ............ 420/502, 420/501, 505; 430/2.7 C, 11, 945; 428/64.4
See application file for complete search history.

(56) References Cited

U.S. PATENT DOCUMENTS

| | | | |
|---|---|---|---|
| 4,450,553 A | 5/1984 | Holster et al. | |
| 4,743,526 A | 5/1988 | Ando et al. | 430/945 |
| 5,171,392 A | 12/1992 | Iida et al. | 264/22 |
| 5,171,643 A * | 12/1992 | Suzuki et al. | 428/671 |
| 5,640,382 A | 6/1997 | Florczak et al. | 369/275.1 |
| 5,716,761 A | 2/1998 | Iida et al. | 430/230.11 |
| 5,853,872 A | 12/1998 | Shimamori et al. | |
| 6,280,811 B1 | 8/2001 | Nee | 428/64.1 |
| 6,292,457 B1 | 9/2001 | Preuss et al. | 428/64.4 |
| 6,351,446 B1 | 2/2002 | Weinzerl et al. | 428/64.4 |
| 6,841,049 B1 * | 1/2005 | Ito et al. | 204/298.15 |
| 2002/0034603 A1 * | 3/2002 | Nee | 428/64.1 |
| 2002/0150772 A1 | 10/2002 | Nakai et al. | 428/457 |

FOREIGN PATENT DOCUMENTS

| | | | |
|---|---|---|---|
| CN | 1073292 | * | 6/1993 |
| EP | 0064777 | * | 11/1982 |
| EP | 1122723 | * | 8/2001 |
| JP | 48-095311 | * | 12/1973 |
| JP | 02-192046 | | 7/1990 |

(Continued)

OTHER PUBLICATIONS

STN abstract of Li et al., "Internal oxidation and properties of palladium-40% silver-1% Re(Re=Sm, Eu, Gd) alloys", Guijinshu vol. 11(2) pp. 18-22 (1990).*

(Continued)

*Primary Examiner*—Martin Angebranndt
(74) *Attorney, Agent, or Firm*—Hiscock & Barclay, LLP

(57) ABSTRACT

An optical data recording and storage medium that includes a reflective layer formed from a silver alloy that contains, in addition to silver, about 0.2 to about 1.0 wt. %, based on the total weight of alloy, of samarium (Sm), about 0.2 to about 2.0 wt. % of copper (Cu), about 0.1 to about 0.3 wt. % of titanium (Ti), and about 0.2 to about 0.8 wt .% of manganese (Mn).

10 Claims, 2 Drawing Sheets

FOREIGN PATENT DOCUMENTS

| | | | |
|---|---|---|---|
| JP | 05-159363 | * | 6/1993 |
| JP | 07-207384 | * | 8/1995 |
| JP | 07-228931 | * | 8/1995 |
| JP | 07-301705 | * | 11/1995 |
| JP | 08-291347 | * | 11/1996 |
| JP | 09-212915 | | 8/1997 |
| JP | 10-011799 | | 1/1998 |
| JP | 2002-015464 | * | 1/2002 |

OTHER PUBLICATIONS

STN abstract of Xie et al., CN 1301875 teaches a CuAgFe alloys with 0.5% Sm.*

By STN abstract of Ivanov, et al., "Heats of formation for silver-barium and silver-samarium melts", Khimicheskie I Boilogicheskie Nauki, vol. 8, pp. 43-44 (1990).*

Fert et al., "Skew scattering by a rare-earth impurities in silver gold and aluminum", Physical Review B vol. 13(1) pp. 397-411.*

Ivanov, et al., "Heats of formation for silver-barium and silver-samarium melts", Khimicheskie I Boilogicheskie Nauki, vol. 8, pp. 43-44(1990).*

W.L. Bond, Optical Society of America, Journal, Jun. 1954, pp. 429-438, vol. 44, No. 6.

* cited by examiner

SILVER-REACTIVE METAL ALLOYS FOR OPTICAL DATA STORAGE AND RECORDABLE STORAGE MEDIA CONTAINING SAME

CROSS-REFERENCE TO RELATED APPLICATION

This application claims priority from Provisional Application Serial No. 60/392,729, filed Jun. 28, 2002, the disclosure of which is incorporated herein by reference.

FIELD OF THE INVENTION

The present invention relates to optical data storage and, more particularly to storage media containing reflective layers formed from silver-reactive metal alloys, specifically alloys of silver with the rare earth metal samarium.

BACKGROUND OF THE INVENTION

Reflective metal thin films are used in creating optical storage media. These thin metal layers are sputtered onto patterned transparent disks to reflect a laser light source. The reflected laser light is read as light and dark spots of certain length, converted into electrical signals, and transformed into images and sounds associated with music, movies, and data. All optical media formats, including compact disk (CD), laser disk (LD), and digital video disk (DVD), employ at least a single reflective metal layer, L1, for which aluminum is the metal of choice. More advanced optical media technology utilizes multiple reflective layers to increase the storage capacity of the media. For instance, many DVD's such as DVD 9, DVD 14, and DVD 18 contain two reflective layers, which enables two layers of information to be read from one side of the disk. The second layer, known as the L0 semi-reflective layer, must be thin enough, typically less than 10 nm, to allow the underlying L1 layer to be read, but it must still be sufficiently reflective, about 18% to about 30% reflectivity, to be read. The disk can further include one or more additional semi-reflective layers read from the same side as the L1 and L0 layers. The construction and reading methodology of a DVD containing two reflective layers is shown in FIG. 1.

When digital data is read from an optical storage medium, the lengths of the pits, typically of 9 different lengths, are read using an internal clock timing and converted into a high frequency electrical signal, which is truncated to generate square waves and transformed into a binary electrical data stream.

Variances in the length of the pits caused by molding the polycarbonate or the incomplete metallization of the entire pit can cause errors in interpreting the data reflected by the laser. For optical media applications, the electronic circuits that interpret the data are specially designed to allow for a certain number of errors. There are four primary error indicators for optical media data. These critical parameters are categorized as:

1) PI—the total number of unreadable pits within a specified area; while industry standards allow for 280 defects, many companies hold this parameter to a maximum of 100

2) Jitter—the timing variation in pit or land length compared to the internal clock pulses; the industry maximum is 8%

3) Reflectivity—the percentage of laser light reflected from the pits; the industry standard is 18 to 30%

4) I-14—the variance in the longest pit length; the industry standard is less than 0.15% within one revolution and less than 0.33% within the disk.

The initial quality of the master used for making the polycarbonate disks, the polycarbonate, and the reflective materials are critical to the production of accurate data. Not only must the metallizing material be capable of uniform deposition and reflectivity, it must also be capable of fully filling the data storage pits that store the data. In addition, the industry uses an environmental test that subjects the disk to a specific temperature and humidity for a specified period of time. The industry standard for this test is temperature of 70° C. at 50% relative humidity for 96 hours (70/50/96). Many companies have adapted stricter internal specifications to raise the temperature to 80° C. and humidity to 85% for 96 hours (80/85/96).

After manufacturing, the data storage disks are scanned for errors, exposed to the environmental testing chamber, and subsequently re-analyzed for errors. Any failures at any testing stage, based on industry standards for error rates, or marked deterioration, even if not actually failing, after environmental testing will lead to rejections. The environmental testing demands a corrosion resistant material for the reflective metallizations. While a thickness of 20 nm of Al generally is adequate for the fully reflective layer as produced, a thickness of 40 nm may be required to provide adequate reflectivity after environmental exposure. Typically, about half of the original aluminum layer is transformed into transparent aluminum oxide during this environmental test. The semi-reflective layer is dramatically more critical since its apparent thickness and reflecting qualities cannot change by more than about 10% of its original relative value during environmental exposure.

In addition to the testing noted above, there is also a non-industry specification regarding UV or sunlight exposure. It has been found that disks made with silver alloys can discolor when subjected to sunlight. While the chemistry of the reaction is not fully understood, it is caused by a combination of the silver alloy used for the semi-reflective layer and the adhesive used to attach it to the fully reflective layer. A disk is deemed to have failed once its reflectance falls below 18% for either the semi-reflective layer or the fully reflective layer, the latter being viewed through the adhesive and the semi-reflective layer.

Aluminum, gold, silicon and silver alloys have been successfully used to create reflective layers for optical storage media. Because of its low cost, excellent reflectivity and sputtering characteristics on polymeric materials, aluminum is an especially preferred metal for a reflective coating that is used almost exclusively whenever there is only one reflective data layer and is also used to form the fully reflective L1 layer on a two-layer DVD. However, aluminum oxidizes readily, and its reflectivity can be compromised upon environmental exposure. This oxidation prohibits the use of aluminum for all but the fully reflective layer, where it is deposited more heavily than the semi-reflective layer would allow. Gold and silicon were the first materials to be used for the semi-reflective layer in DVD construction, but both materials have significant drawbacks. Gold provides excellent reflectivity of red laser light, excellent sputtering characteristics, and superior corrosion resistance but is very costly. Silicon is also reflective and free from corrosion but does not sputter as efficiently as the other metals. Furthermore, silicon is brittle, and cracks may form during thermal cycling and mechanical flexing, which prevents delicate data from being read. U.S. Pat. No. 5,640,382 describes the construction of a DVD data storage disk, and U.S. Pat. No. 5,171,392 describes the use of gold and silicon for the semi-reflective data storage layer; the disclosures of these patents are incorporated herein by reference.

Silver, like gold, has excellent sputtering characteristics and reflectivity, but the corrosion resistance of pure silver is inadequate for it to be used as the semi-reflective layer. Considerable effort has been expended to make silver sufficiently corrosion resistant so that it can be used for the semi-reflective layer, as described, for example, in U.S. Pat. Nos. 6,280,811, 6,292,457, and 6,351,446, the disclosures of which are incorporated herein by reference. These patents describe silver based alloys for optical media whose corrosion resistance is improved by the addition of other precious metals such as palladium, platinum, and gold. While markedly less expensive than gold alone, the addition of these precious metals to silver in contents up to 30 wt. % dramatically increases their cost over that of pure silver.

For the manufacture of optical data recording and storage media, there is an ongoing need for silver alloys with uniform sputtering characteristics and improved corrosion resistance that do not require the inclusion of more expensive precious metals. This need is met by the alloys of the present invention, whose properties make them especially suitable for use in optical data recording and storage media, in particular, for use in the semi-reflective layer of a DVD.

SUMMARY OF THE INVENTION

The present invention is directed to an optical data recording and storage medium that includes a reflective layer formed from a silver alloy that comprises, in addition to silver, about 0.2 to about 1.0 wt. %, based on the total weight of alloy, of samarium (Sm), in addition to copper, titanium and manganese in specific amounts as will be described.

DETAILED DESCRIPTION OF THE INVENTION

Pure silver has excellent reflectivity but insufficient corrosion resistance to be used as the semi-reflective layer in a multilayered optical data storage disk. Addition of small amounts of certain readily oxidizable metals, in particular, the rare earth metal samarium (Sm), to silver can improve its corrosion resistance while maintaining its desirable reflectivity, thereby providing a desirable material for use in reflective layers of optical recording and storage media. Although the alloys of the invention are especially suited for use in thin-film semi-reflective layers, they may also be beneficially employed in fully reflective layers of single or multiple layered media, whether in disk or in other media formats.

Figure 1:
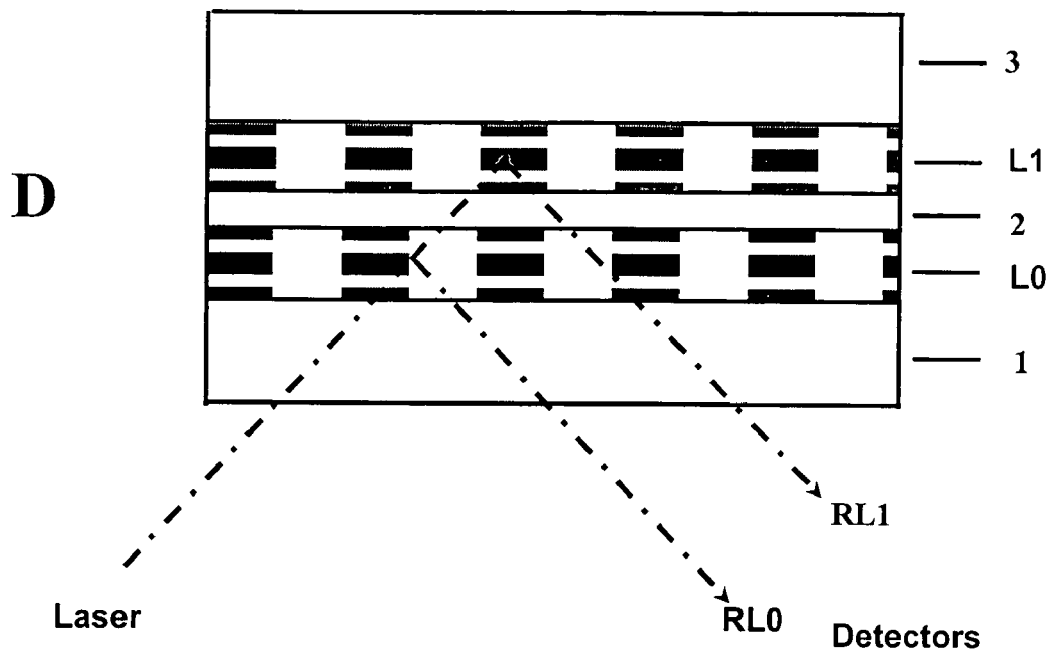
FIG. 1 is a schematic representation of an optical data storage disk that depicts two reflective layers, one of which is a thin semi-reflective layer, and their positions in the disk.

FIG. 1 schematically depicts an optical data storage disk D containing reflective layers L1 and L0. Reflective layer L1 is the fully reflective layer and is typically formed from aluminum. The thin semireflective layer L0 is formed from a silver alloy of the present invention. Light from a laser source that is reflected from layer L1 is designated RL1; similarly, light reflected from layer L0 is designated RL0. The reflected light RL1 and RL0 is sensed by detectors. It should be noted that the light from a laser source must penetrate the semi-reflective layer L0 twice in order to read layer L1.

In disk D, layers 1 and 3, which typically are formed from a plastic such as polycarbonate or poly(methyl methacrylate) (PMMA), are imprinted with digital information comprising pits and lands. Layer 2 is an adhesive layer, typically comprising a UV-curable epoxy material, that is used to join layers 1 and 3.

Figure 2:
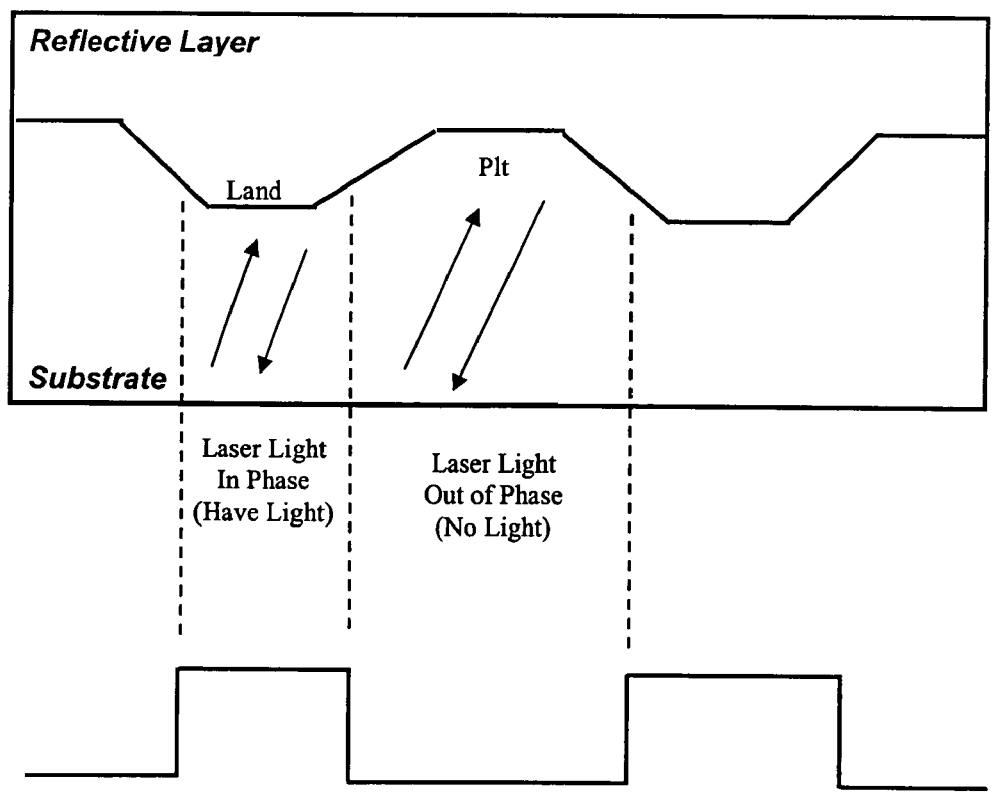
FIG. 2 is a schematic representation of pits and lands corresponding to digital data recorded on an optical data storage disk, together with a reflective signal produced by this layer.

FIG. 2 schematically illustrates the digital interpretation of the information stored on optical data disk D. The lands are at a distance from the laser and the detector such that reflected signals return to the detector in phase (bright), while the pits are at a second distance such that the signal returns to the detector out of phase (dark).

Figure 3:
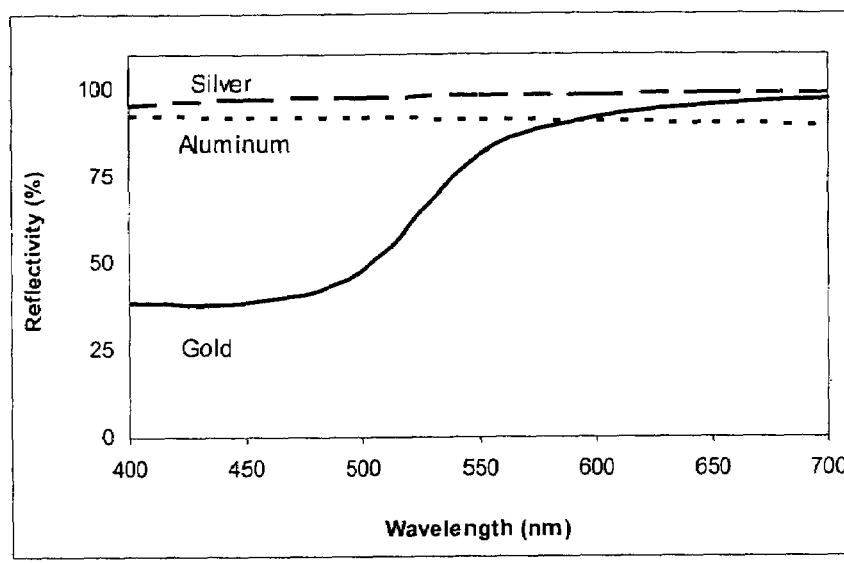
FIG. 3 is a graph showing the reflectivity of metallic silver, aluminum, and gold over the visible spectrum of light.

FIG. 3 shows the reflectivity of several important metals—silver, aluminum, and gold—over the visible spectrum of light. Most optical data disks are read with light waves approximately 650 nm, in the red portion of the visible spectrum. More recently, however, blue light-emitting laser diodes have become commercially available, which enables the storage and reading of much denser data. As shown in FIG. 3, metallic silver exhibits high reflectivity across the entire visible light spectrum.

Figure 4:
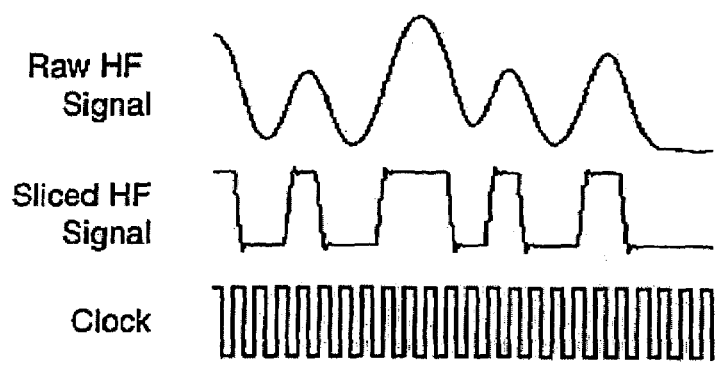
FIG. 4 is a schematic illustration of an electrical signal as it is read from an optical media storage disk.

FIG. 4 illustrates the sinusoidal electrical signal read from an optical media storage disk that depicts how it is truncated and compared to an internal clock to decipher the pulse length and data contained on the disk.

Figure 5:
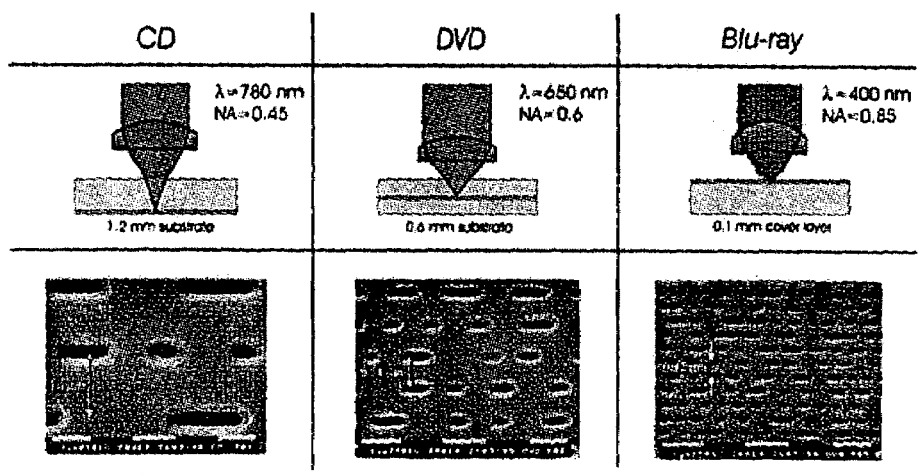
FIG. 5 is an illustration of the data tracks in various optical media formats.

FIG. 5 is an illustration of the data tracks and pits used for data storage on CD, DVD and Blu-ray optical media formats. The new blue laser format, which employs a higher frequency (higher clock rate) laser to discern smaller data pits with less distance between tracks, allows for five times as much data as on a disk using a red laser, making it especially useful for high definition television (HDTV) formats. Optical data recording and storage disks having reflective layers formed from silver alloys of the present invention can be used with blue lasers.

Corrosion resistant silver based alloys are formed, in accordance with the present invention, by the inclusion of about 0.2 to about 1.0 wt. %, more preferably, about 0.25 to about 0.35 wt. %, based on the total weight of alloy, of the rare earth metal samarium (Sm). The high solubility of samarium (Sm) compared to other reactive rare earth metals enables it to be added in relatively large amounts of the metal without the formation of secondary phases, which can become particulates during sputtering and cause defects in the reflective coating. A multiphase alloy may sputter as a single-phase layer, but if the coated layer is not stable as a single-phase material, then thermal exposure can cause the precipitation of the second phase, and this too will result in defects, particularly under harsh test conditions. For example, separation of a rare earth metal phase in a silver alloy comprising a semi-reflective layer may create dark spots and cause errors in the optical data.

In addition to exhibiting good silver solubility, it is also desirable that the added rare earth metal exhibit high reactivity to air. The inclusion in silver alloys of samarium (Sm), which is highly reactive, has been found to produce a highly protective effect compared with pure silver in DVDs that are subjected to stringent environmental testing. The solubility limits and relative reactivity of the rare earth metals are presented in TABLE 1 below:

TABLE 1

| Element | Solubility | Reactivity | Element | Solubility | Reactivity |
| --- | --- | --- | --- | --- | --- |
| La | 0.06 | High | Gd | 1.4 | Medium |
| Ce | 0.06 | High | Tb | 1.6 | Medium |
| Pr | 0.05 | High | Dy | 1.9 | Medium |
| Nd | 0.25 | High | Ho | 2.4 | Medium |
| Sm | 0.35* | High | Er | 5.5 | Medium |
| Eu | 0.0 | High | Tm | 7.0 | Medium |
|  |  |  | Lu | 9.0 | Medium |

*During our investigation we determined by metallographic examination that the correct solubility of samarium in silver is about 0.35 wt %, much less than the 1.4 wt. % commonly cited in reference sources.

As shown by the entries in TABLE 1, among the rare earth metals having high reactivity, samarium (Sm) has the highest solubility in silver. Also, as a consequence of its high reactivity, addition of small amounts of samarium (Sm) provides desirably high corrosion resistance. The rare earth metal neodymium (Nd) is included in silver-based alloys described in U.S. patent application Ser. No. 2002/0150772, the disclosure of which is incorporated by reference. However, as shown in TABLE 1, the solubility in silver of neodymium (Nd) is substantially less than that of Samarium (Sm).

Copper (Cu) is included in the silver alloys of the present invention to facilitate their manufacturability as well as to improve their shelf life and their corrosion resistance when exposed to the harshest environmental testing conditions. The amount of copper (Cu) included in the alloys is about 0.25 to about 1.0 wt. %, based on the total weight of alloy.

Titanium (Ti), while it does not add substantially to corrosion resistance, has good solubility, 2 wt. %, in silver and is included in the silver alloys of the present invention because of its scavenging effect during melting and alloying. It also acts as a grain refiner during rolling and annealing of the cast alloy ingots used to make the sputtering targets. The amount of titanium (Ti) included in the alloys is about 0.1 to about 0.3 wt. %, based on the total weight of the alloy.

Manganese (Mn), although it may add only marginally to corrosion resistance, has high solubility, 33 wt. %, in silver is included in the silver alloys of the present invention, providing improvement in sputtering characteristics and control of reflectivity. The amount of manganese (Mn) included in the alloys is about 0.2 to about 0.8 wt. %, based on the total weight of the alloy.

Samarium (Sm) is included in the silver-based alloy of the present invention in amounts as stated above, whereas the addition of samarium in areater amounts will negatively affect silver reflectivity and thereby compromise the semi-reflective layer.

Thin semi-reflective layers can be formed from the alloys of the present invention by sputtering techniques well known in the art. The following examples of silver alloys are presented to illustrate the scope of the invention:

EXAMPLE 1

A silver based alloy containing about 3.0 wt. % Sm

EXAMPLE 2

A silver based alloy containing about 1.0 wt. % Sm

EXAMPLE 3

A silver based alloy containing about 0.5 wt. % Sm and about 0.5 wt. % Ti

EXAMPLE 4

A silver based alloy containing about 0.3 wt. % Sm and about 1.0 wt. % Cu

EXAMPLE 5

A silver based alloy containing about 1.5 wt. % Sm and about 0.5 wt. % Mn

EXAMPLE 6

A silver based alloy containing about 0.7 wt. % Sm and about 0.4 wt. % Al

EXAMPLE 7

A silver based alloy containing about 0.1 wt. % Sm, about 1.0 wt. % Cu, and about 0.5 wt. % Ti

EXAMPLE 8

A silver based alloy containing about 0.9 wt. % Sm, about 0.1 wt. % Ti, and about 1.0 wt. % Mn

EXAMPLE 9

A silver based alloy containing about 0.3 wt. % Sm, about 0.7 wt. % Cu, and about 0.7 wt. % Pt

EXAMPLE 10

A silver based alloy containing about 0.3 wt. % Sm, about 0.7 wt. % Cu, and about 0.7 wt. % Pd

EXAMPLE 11

A silver based alloy containing about 0.3 wt. % Sm, about 0.5 wt. % Ti, and about 0.5 wt. % Au

EXAMPLE 12

A silver based alloy containing about 1.0 wt. % Sm, about 0.3 wt. % Mn, and about 0.3 wt. % Pd

EXAMPLE 13

A silver based alloy containing about 0.5 wt. % Sm, about 1.0 wt. % Cu, about 0.5 wt. % Ti, and about 1.0 wt. % Mn

EXAMPLE 14

A silver based alloy containing about 0.3 wt. % Sm, about 0.7 wt. % Cu, about 0.2 wt. % Ti, and about 0.5 wt. % Mn TABLE 2 below contains test data showing the testing data from DVD's containing semi-reflective layers made from samarium,(Sm)-containing silver alloys, along with various comparison DVD's. Three test conditions are shown for each alloy: 1) an initial test run shortly after preparation of the DVD; 2) 70/50/96—a test following exposure of the DVD to a chamber at 70° C., 50% relative humidity (RH) for 96 hours; 3) 80/85/96—a test following chamber exposure at 80° C., 85%RH for 96 hours. As previously noted, PI is the industry standard terminology for defective pits within a certain area, jitter is caused by a combination of factors and is limited to 8%, and I-14 is a measure of the longest pit based on the length of the internal clock. The test data are presented in pass (P) and fail (F) notation for each of the conditions and criteria. Current requirements for DVD environmental testing are based on the less harsh test of 70/50/96. However, most of the major DVD replicators use the more severe 80/85/96 test for internal quality assurance.

As shown by the first entry for comparison DVD C-1 in TABLE 2, a pure silver semi-reflective layer almost passes the industry specifications, failing only in jitter after the 70/50/96 test. However, after the 80/85/96 exposure conditions, control C-1 can no longer be read.

Inclusion of 0.7 wt. % copper (Cu) in the silver semi-reflective layer in comparison DVD C-2 improves jitter to a passing result under the standard industry test, but the more severe 80/85/96 exposure results in failure in all tests.

The semi-reflective layers in comparison DVD's C-3 and C-4 are formed from silver-copper alloys that further include, respectively, 0.25 wt. % aluminum (Al) and 0.75 wt. % manganese (Mn). Inclusion of these metals results in passing results in both the PI and jitter tests under 80/85/96 exposure conditions. However DVD's C-3 and C-4 fail the I-14 test initially and under the two environmental exposure conditions.

The semi-reflective layer in comparison DVD's C-5 and C-6 are formed from silver-copper alloys that further include, respectively, 0.75 wt. % of the medium air-reactive rare earth metal dysprosium (Dy) and 1.0 wt. % of the more air-reactive rare earth metal neodymium (Nd). As with DVD's C-3 and C-4, comparison DVD's C-5 and C-6 fail the I-14 test initially and under the two environmental exposure conditions. In addition, DVD C-5 also fails the 80/85/96 PI test.

DVD's C-7, C-8, and C-9 are formed from silver alloys each containing 0.7 wt. % copper (Cu) and 0.5 wt. % manganese (Mn) and, in addition, 0.25 wt. % of, respectively, the rare earth metals dysprosium (Dy), neodymium (Nd), and cerium (Ce). Similar results are obtained from DVD's C-7, C-8, and C-9; each passes all tests except PI and Jitter under the 80/85/96 exposure conditions. As shown by comparison with DVD's C-5 and C-6, inclusion of manganese (Mn) in DVD's C-7, C-8, and C-9 results in improved I-14 results under all test conditions.

DVD's I-1 and 1-2 which include, respectively, 1.0 and 0.25 wt. % samarium (Sm) in the silver semi-reflective layer, produce passing results in all three of the standard industry tests under 70/50/96 exposure conditions but failure in the same tests under 80/85/96 conditions.

DVD I-3 of the invention, in which the semi-reflective layer is formed from a silver alloy containing 0.25 wt. % samarium (Sm) and 0.7 wt. % copper (Cu), gives passing results in the three tests both under the standard 70/50/96 exposure conditions as well as under the more stringent 80/85/96 conditions.

Similar excellent test results under both the 70/50/96 and 80/85/96 test conditions are shown by DVD's I-4 and I-5 of the present invention, in which the silver alloys contain, in addition to samarium (Sm) and copper (Cu), 0.5 wt. % manganese (Mn) and 0.2 wt. % titanium (Ti), respectively.

A comparison of the results of DVD's I-3, I-4, and I-5 of the present invention, whose semi-reflective layers are formed from samarium (Sm)-containing silver alloys, with DVD's C-5 through C-9, in which the semi-reflective layers are formed from alloys containing other rare earth metals, specifically, dysprosium (Dy), neodymium (Nd), and cerium (Ce), shows the advantage of samarium (Sm) over other rare earths for protecting DVD's against damage, even under severe exposure conditions.

DVD I-6 is similar to DVD I-3 except for its silver alloy containing a higher concentration of samarium (Sm), 0.75 wt. % vs 0.25 wt. %; the concentration of copper in both alloys is the same, 0.7 wt. %. DVD I-6 also produces very good test results, failing only the PI test under the stringent 80/85/96 conditions.

Similarly, DVD I-7, which contains the same concentration of samarium (Sm), 1.0 wt. %, as DVD I-1 but also includes 0.5 wt. % copper (Cu), gives very good results, failing only the I-14 test under the 80/85/96 exposure conditions.

DVD I-8 is similar to DVD I-3 except for its silver alloy, containing a considerably higher concentration of samarium (Sm), 4.0 wt. % vs 0.25 wt. %; the concentration of copper in both alloys is the same, 0.7 wt. %. DVD I-8 passes all three tests under the industry standard conditions but fails the PI and I-14 tests under the stringent 80/85/96 conditions.

As demonstrated by the results presented in TABLE 2, inclusion of samarium (Sm) at levels of preferably up to about 1.0 wt. %, more preferably, about 0.25 to about 0.35 wt. %, in silver alloys comprising DVD semi-reflective layers, provides beneficial results under severe environmental test conditions. Further inclusion of copper (Cu), titanium (Ti) and manganese (Mn) in amounts as described in the samarium (Sm)-containing silver alloys enhances the benefit.

The invention has been described in detail with particular reference to certain preferred embodiments thereof, but it is understood that variations and modifications can be effected within the spirit and scope of the invention, which is defined by the claims that follow.

TABLE 2

| | Ag Alloy | Condition | PI | Jitter | I-14 |
|---|---|---|---|---|---|
| C-1 comparison | pure Ag | Initial | P | P | P |
| | | 70/50/96 | P | F | P |
| | | 80/85/96 | F | F | F |
| C-2 comparison | Ag 0.7% Cu | Initial | P | P | F |
| | | 70/50/96 | P | P | F |
| | | 80/85/96 | F | F | F |
| C-3 comparison | Ag 0.7% Cu 0.25% Al | Initial | P | P | F |
| | | 70/50/96 | P | P | F |
| | | 80/85/96 | P | P | F |
| C-4 comparison | Ag 0.5% Cu 0.75% Mn | Initial | P | P | F |
| | | 70/50/96 | P | P | F |
| | | 80/85/96 | P | P | F |
| C-5 comparison | Ag 0.75% Dy 0.7% Cu | Initial | P | P | F |
| | | 70/50/96 | P | P | F |
| | | 80/85/96 | F | P | F |
| C-6 comparison | Ag 1.0% Nd 0.5% Cu | Initial | P | P | F |
| | | 70/50/96 | P | P | F |
| | | 80/85/96 | P | P | F |
| C-7 comparison | Ag 0.25% Dy 0.7% Cu 0.5% Mn | Initial | P | P | P |
| | | 70/50/96 | P | P | P |
| | | 80/85/96 | F | F | P |
| C-8 comparison | Ag 0.25% Nd 0.7% Cu 0.5% Mn | Initial | P | P | P |
| | | 70/50/96 | P | P | P |
| | | 80/85/96 | F | F | P |
| C-9 comparison | Ag 0.25% Ce 0.7% Cu | Initial | P | P | P |
| | | 70/50/96 | P | P | P |
| | | 80/85/96 | P | P | P |

TABLE 2-continued

| Ag Alloy | | Condition | PI | Jitter | I-14 |
|---|---|---|---|---|---|
| | 0.5% Mn | 80/85/96 | F | F | P |
| I-1 invention | Ag 1.0% Sm | Initial 70/50/96 80/85/96 | P P F | P P F | P P F |
| I-2 invention | Ag 0.25% Sm | Initial 70/50/96 80/85/96 | P P F | P P F | P P F |
| I-3 invention | Ag 0.25% Sm 0.7% Cu | Initial 70/50/96 80/85/96 | P P P | P P P | P P P |
| I-4 invention | Ag 0.35% Sm 0.7% Cu 0.5% Mn | Initial 70/50/96 80/85/96 | P P P | P P P | P P P |
| I-5 invention | Ag 0.35% Sm 1.0% Cu 0.2% Ti | Initial 70/50/96 80/85/96 | P P P | P P P | P P P |
| I-6 invention | Ag 0.75% Sm 0.7% Cu | Initial 70/50/96 80/85/96 | P P F | P P P | P P P |
| I-7 invention | Ag 1.0% Sm 0.5% Cu | Initial 70/50/96 80/85/96 | P P P | P P P | P P F |
| I-8 invention | Ag 4.0% Sm 0.7% Cu | Initial 70/50/96 80/85/96 | P P F | P P P | P P F |

What is claimed is:

1. An optical data recording and storage medium comprising a substrate and at least one reflective layer able to transmit and reflect laser light, the layer formed from a silver-based alloy containing at least 97.0 wt. % silver and based on the total weight of alloy, from about 0.2 to about 1.0 wt. % samarium (Sm) and from about 0.2 to about 2.0 wt. % copper (Cu).

2. The optical data recording and storage medium of claim 1 wherein said silver-based alloy comprises from about 0.25 to about 0.35 wt. %, based on the total weight of alloy, of samarium (Sm).

3. The optical data recording and storage medium of claim 1 wherein said silver-based alloy comprises from about 0.25 to about 1.0 wt. % copper (Cu).

4. The optical data recording and storage medium of claim 1 wherein said silver-based alloy further comprises from about 0.05 to about 0.5 wt. % titanium (Ti).

5. The optical data recording and storage medium of claim 4 wherein said silver-based alloy comprises from about 0.1 to about 0.3 wt. % titanium (Ti).

6. The optical data recording and storage medium of claim 1 wherein said silver-based alloy further comprises from about 0.1 to about 1.5 wt. % manganese (Mn).

7. The optical data recording and storage medium of claim 6 wherein said silver-based alloy comprises from about 0.2 to about 0.8 wt. % manganese (Mn).

8. The optical data recording and storage medium of claim 1 wherein said silver-based alloy consists essentially of from about 0.2 to about 1.0 wt. % samarium (Sm), from about 0.2 to about 2.0 wt. % copper (Cu), from about 0.1 to about 0.3 wt. % titanium (Ti), and manganese (Mn), the balance being silver (Ag).

9. The optical data recording and storage medium of claim 1 wherein said silver-based alloy consists essentially of from about 0.25 to about 0.35 wt. % samarium (Sm), from about 0.25 to about 1.0 wt. % copper (Cu), from about 0.1 to about 0.3 wt. % titanium (Ti), and from about 0.2 to about 0.8 wt. % manganese (Mn), the balance being silver (Ag).

10. The optical data recording and storage medium of claim 9 wherein said silver-based alloy consists essentially of about 0.3 wt. % samarium (Sm), about 0.7 wt. % copper (Cu), about 0.2 wt. % titanium (Ti), and about 0.5 wt. % manganese (Mn), the balance being silver (Ag).

* * * * *